(12) United States Patent
Watada et al.

(10) Patent No.: US 6,693,249 B2
(45) Date of Patent: Feb. 17, 2004

(54) INHIBITOR SWITCH

(75) Inventors: Tsutomu Watada, Tokyo (JP); Takashi Nakazawa, Tokyo (JP)

(73) Assignee: Niles Parts Co., Ltd. (JP)

( * ) Notice: Subject to any disclaimer, the term of this patent is extended or adjusted under 35 U.S.C. 154(b) by 0 days.

(21) Appl. No.: 10/123,430

(22) Filed: Apr. 17, 2002

(65) Prior Publication Data

US 2002/0153235 A1 Oct. 24, 2002

(30) Foreign Application Priority Data

Apr. 20, 2001 (JP) .................................. P2001-123640

(51) Int. Cl.7 ............................................... H01H 21/18
(52) U.S. Cl. .................................................. 200/61.91
(58) Field of Search ......................... 200/61.88, 61.91

(56) References Cited

U.S. PATENT DOCUMENTS

| | | | |
|---|---|---|---|
| 5,325,083 A | 6/1994 | Nassar et al. ............... | 340/456 |
| 5,692,600 A | 12/1997 | Bradshaw ................... | 200/571 |
| 5,902,975 A * | 5/1999 | Coulson et al. .......... | 200/61.91 |

FOREIGN PATENT DOCUMENTS

JP      08 293228 A     11/1996     ............. 200/61.88

* cited by examiner

*Primary Examiner*—Renee Luebke
(74) *Attorney, Agent, or Firm*—Rader, Fishman & Grauer PLLC; Ronald P. Kananen

(57) ABSTRACT

An inhibitor switch is used to correctly perform the detection of speed change positions. This inhibitor switch has a terminal block with fixed contacts and a moving block which is mounted and fitted onto a manual shaft of an automatic transmission, has a signaling contact and large capacity current-carrying contacts, and is rotatable relative to the terminal block. This inhibitor switch is used for electrically detecting a speed change position of the automatic transmission on the basis of a relative rotating positional relationship of the fixed contacts and the signaling contact in accordance with the rotation of the manual shaft. The moving block, which is mounted on the manual shaft, has a boss portion formed of a resin and a contact support portion whereon the signaling contact and large capacity current-carrying contacts are mounted. The contact support portion is formed of metal and the signaling contact is joined to the contact support portion by caulking.

6 Claims, 6 Drawing Sheets

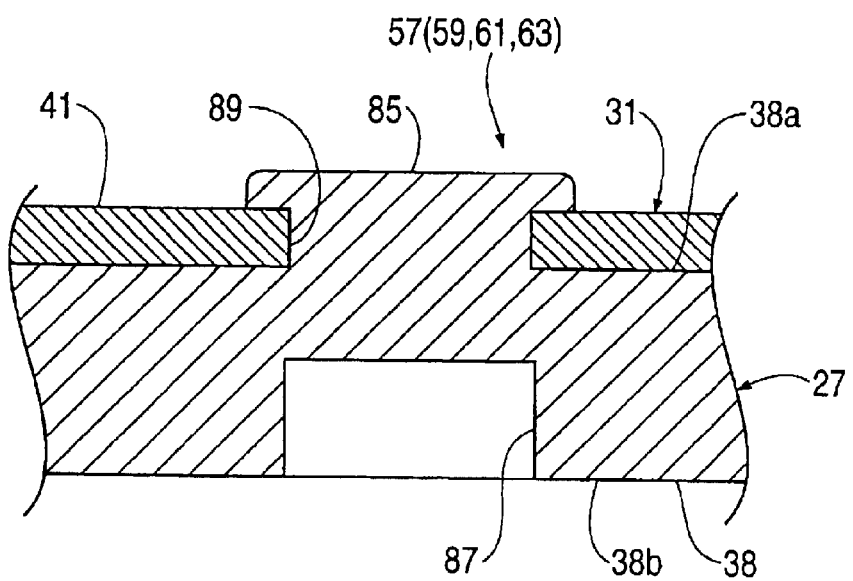

INHIBITOR SWITCH

BACKGROUND OF THE INVENTION

1. Field of the Invention

The invention relates to an inhibitor switch.

2. Description of the Related Art

Conventional inhibitor switches are shown, for example, in FIG. 7 of Japanese Patent Laid-Open No. 293228/1996. FIG. 7 shows a perspective view of an inhibitor switch.

As shown in FIG. 7, an inhibitor switch 101 is provided with a terminal block 103, a casing 105 and a moving block 107. The terminal block 103 is provided with a plurality of fixed contacts 109.

The moving block 107 is provided with moving contacts 111. The moving block 107 is supported to be rotatable relative to the terminal block 103 and a casing 105. The moving block 107 is provided with a fitting hole 119, which is fitted onto a manual shaft of an automatic transmission.

A body 121 of the moving block 107 is formed of a resin, and the moving contacts 111 are positioned on and heat clamped on the body 121 to be fixedly joined thereto. An example of such positioning and fixed joining is shown in FIG. 8.

As shown in FIG. 8, the body 121 of the moving block 107, which is generally formed of a resin, is provided with positioning projections 123 for positioning and caulking projections 125 for heat caulking. In FIG. 8, the caulking projections 125 have heads after heat caulking but are in the form of straight projections prior to heat caulking. The moving contacts 111 are provided with positioning holes 127 for positioning and caulking holes 129 for heat caulking. The positioning holes 127 of the moving contacts 111 are fitted onto the positioning projections 123 of the body 121 to be positioned on the body 121, in which state the caulking projections 125 being fitted into the caulking holes 129 of the moving contacts 111 are heat clamped as shown in FIG. 8 such that the moving contacts 111 are fixedly joined to the body 121.

Accordingly, when the terminal block 103 is fixed on a housing of the automatic transmission and the manual shaft is fitted into the fitting hole 119 of the moving block 107 for use, the moving block 107 rotates together with rotation of the manual shaft. Rotation of the moving block 107 causes the moving contacts 111 to slide relative to the fixed contacts 109 so that the moving contacts 111 put the fixed contacts 109 in selective conducting condition at predetermined speed change positions. Accordingly, speed change positions of the automatic transmission can be electrically detected based on the relative rotation positional relationship of the fixed contacts 109 and the moving contacts 111, conformed to rotation of the manual shaft.

Hereupon, the inhibitor switch 101 is mounted inside or outside the housing of the automatic transmission to be under severe conditions exposed to high temperatures. Accordingly, when the body 121 of the moving block 107 is generally formed of a resin, it undergoes some slight deformation or camber at the time of high temperature, which causes rotation of the moving contacts 111 to be behind rotation of the manual shaft, that is, angular hysteresis leading to a limit on enhancement of detection accuracy of speed change positions.

In contrast, it is possible to suppress deformation or camber at the time of high temperature with the use of a resin having an excellent heat resistance, but there has been caused a problem that a product is increased in cost as a whole because such resin is expensive.

Also, since positioning of the moving contacts 111 relative to the body 121 of the moving block 107 is performed by fitting the positioning holes 127 of the metallic fixed contacts 111 onto the positioning projections 123 of a resin provided on the body 121 as shown in FIG. 8, there has been caused a limit in enhancement of accuracy in positioning the moving contacts 111 on the body 121. Further, since fixation of the moving contacts 111 to the body 121 is performed by heat caulking of the caulking projections 125 formed from a resin, not only is it difficult to manage the enhancement of the strength, but a large space is also needed for enhancing the strength in such fixation. In this regard, there is a limitation in ensuring a space in the inhibitor switch 101 which has little spatial margin. Accordingly, enhancement of accuracy in speed change positions has been limited in view of the above-mentioned problems.

SUMMARY OF THE INVENTION

The invention has its object to provide an inhibitor switch, of which positional accuracy is further enhanced.

In a first aspect, the invention provides an inhibitor switch comprising a terminal block with fixed contacts, and a moving block which is mounted and fitted onto a manual shaft of an automatic transmission, has moving contacts, and is rotatable relative to the terminal block, and for electrically detecting a speed change position of the automatic transmission on the basis of a relative rotating positional relationship of the fixed contacts and the moving contacts in accordance with rotation of the manual shaft, the moving block having a boss portion formed of a resin and being mounted on the manual shaft, and an arm-shaped contact support portion mounting thereon the moving contacts, the contact support portion being formed of metal and at least a part of the moving contacts being joined to the contact support portion by caulking.

In a second aspect, the invention provides an inhibitor switch according to the first aspect, wherein a positioning projection for positioning is formed on the contact support portion by means of a press, a positioning hole for positioning is formed on at least a part of the moving contacts, and the positioning hole is fitted onto the positioning projection to position at least a part of the moving contacts relative to the contact support portion.

In a third aspect, the invention provides an inhibitor switch according to the second aspect, wherein a caulking projection for caulking is formed on the contact support portion by means of a press, a caulking hole for the caulking is formed on at least a part of the moving contacts, and the caulking hole is fitted onto the caulking projection to effect the caulking.

In a fourth aspect, the invention provides an inhibitor switch according to any one of the first to third aspects, wherein the contact support portion has a joining hole, which is joined to the boss portion circumferentially.

In a fifth aspect, the invention provides an inhibitor switch according to any one of the first to fourth aspects, wherein a part of the moving contacts comprises a signaling contact formed of a leaf spring and the other part of the moving contacts comprises large capacity current-carrying contacts having a larger conductor cross sectional area than that of the signaling contact, the signaling contact is joined to an intermediate portion of the contact support portion by caulking, and a contact receiving portion formed of a resin is provided on a tip end side of the contact support portion farther than a position of the signaling contact and the large capacity current-carrying contacts are received in the contact receiving portion with biasing members therebetween to elastically bias the large capacity current-carrying contacts toward the fixed points.

The invention according to the first aspect comprises a switch housing having a terminal block with fixed contacts and a cover, and a moving block which is mounted and fitted onto a manual shaft of an automatic transmission, has moving contacts, and is rotatable relative to the switch housing, and can electrically detect a speed change position of the automatic transmission on the basis of a relative rotating positional relationship of the fixed contacts and the moving contacts in accordance with rotation of the manual shaft.

The moving block also has a boss portion formed of a resin and mounted on the manual shaft, and an arm-shaped contact support portion mounting thereon the moving contacts. The contact support portion is formed of metal and at least a part of the moving contacts can be joined to the contact support portion by caulking. Accordingly, since the contact support portion is formed of metal, thermal deformation is suppressed even when circumstances in use are at high temperature, whereby rotation of the manual shaft can be correctly followed. Thereby, angular hysteresis, in which rotation of the moving contacts deviates relative to rotation of the manual shaft, is suppressed, so that enhancement in the detection accuracy of speed change positions can be attained.

Also, since at least a part of the moving contacts is joined to the contact support portion formed of a metal plate by caulking, accuracy in positioning is made easier than in the case of being formed of a resin, and joining strength can be enhanced without the need of much space. Accordingly, accuracy with respect to speed change positions can be enhanced from such points.

In addition to the effect achieved by the invention of the first aspect, according to the invention of the second aspect, the positioning hole of the moving contacts can be fitted onto the positioning projection of the contact support portion to position at least a part of the moving contacts relative to the contact support portion. Besides, the positioning projection for positioning can be formed on the contact support portion by means of a press, and thus formation of the positioning projection of high accuracy makes it possible for the moving contacts to be positioned relative to the contact support portion with good accuracy. Accordingly, accuracy in the detection of speed change positions can be enhanced.

In addition to the effect achieved by the invention of the second aspect, according to the invention of the third aspect, the caulking hole in the moving contacts is fitted onto the caulking projection of the contact support portion to enable performing caulking joining. Besides, the caulking projection for caulking can be formed on the contact support portion by means of a press, and thus control of the caulking projection is facilitated and the joining strength can be greatly enhanced without the need of much space. Accordingly, accuracy in the detection of speed change positions can be enhanced.

In addition to the effect achieved by the invention of any one of the first to third aspects, according to the invention of the fourth aspect, the contact support portion can have a joining hole joined to the boss portion circumferentially. Accordingly, the metallic contact support portion is securely joined to the boss portion of a resin so that the contact support portion can correctly rotate following the rotation of the manual shaft through the boss portion. Accordingly, accuracy in the detection of speed change positions can be further enhanced.

In addition to the effect achieved by the invention of any one of the first to fourth aspects, according to the invention of the fifth aspect, the large capacity current-carrying contacts are supported on a tip end side of the contact support portion farther than a position of the signaling contact, so that a circumferential contact spacing defined on the fixed contacts, of which ON and OFF are detected with elastic contact by the large capacity current-carrying contacts can be ensured to be large in association with a lever ratio. Being greater in contact pressure than that with the signaling contact, the large capacity current-carrying contacts are liable to produce abrasion powder at the time of sliding, so that when circumferential spacings of the fixed contacts are small, the possibility that failure in conduction caused by abrasion powder present between the fixed contacts becomes high. However, failure in conduction can be suppressed by ensuring large circumferential spacings of the fixed contacts in association with the lever ratio.

The positional accuracy on the outer peripheral side is enhanced by forming the contact support portion from a metal, so that accuracy in detection of ON and OFF of the large capacity current-carrying contacts can be greatly enhanced.

The large capacity current-carrying contacts for current-carrying to the starter motor and the like are larger in contact pressure and conductor cross sectional area than the signaling contact, and as such are not easily supported directly on the metallic arm shaped contact support portion. However, the contact receiving portion formed of a resin is provided on a tip end side of the contact support portion to be able to easily support the large capacity current-carrying contacts.

Also, the boss portion and the large capacity current-carrying contacts provided on the tip end side of the arm-shaped contact support portion are interposed between the terminal block and the casing to enable putting the contact support portion in a center state. So, contact pressure can be stabilized even when the signaling contact supported midway through the contact support portion is formed of a leaf spring.

BRIEF DESCRIPTION OF THE DRAWINGS

FIG. 6 is an enlarged, cross sectional view of a caulking portion according to the embodiment.

DESCRIPTION OF THE PREFERRED EMBODIMENTS

Figure 1:
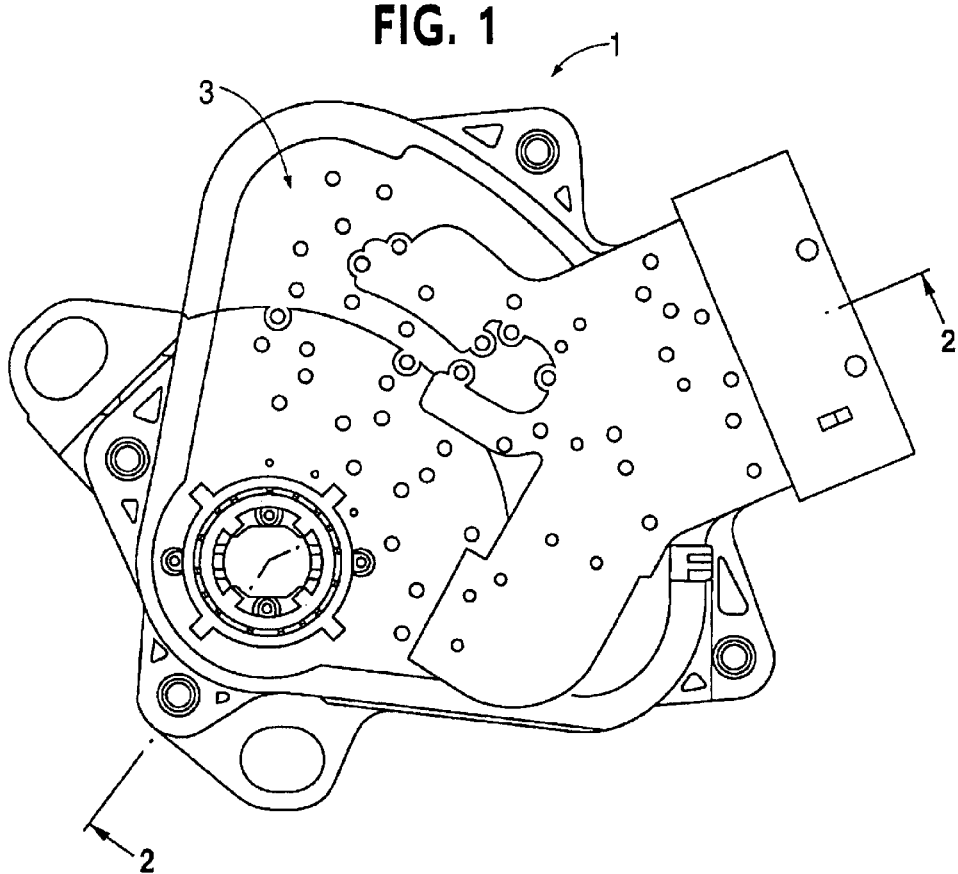
FIG. 1 is a plan view showing an inhibitor switch according to an embodiment of the invention.
Figure 2:
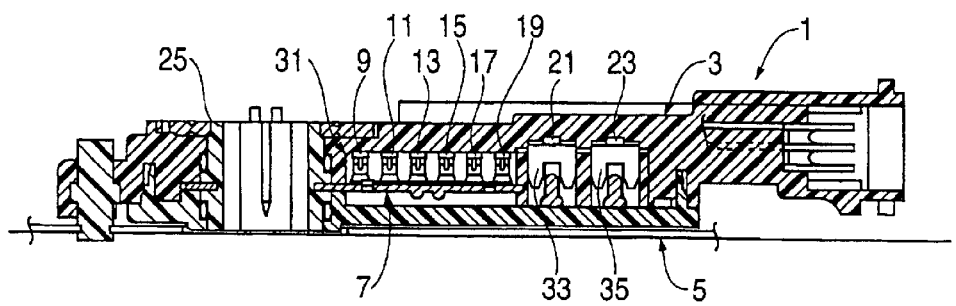
FIG. 2 is a cross sectional view of the embodiment taken along the line 2—2 in FIG. 1.

FIGS. 1 to 6 show an embodiment of the invention. First, FIG. 1 is a plan view showing an inhibitor switch 1 according to the embodiment of the invention, and FIG. 2 is a cross sectional view taken along the line 2—2 in FIG. 1. As shown in FIGS. 1 and 2, the inhibitor switch 1 is provided with a terminal block 3, a casing 5 and a moving block 7.

The terminal block 3 is provided with a plurality of fixed contacts 9, 11, 13, 15, 17, 19, 21, and 23. The casing 5 is joined to the terminal block 3 by welding or the like. The moving block 7 is rotatably supported on the terminal block 3 and the casing 5.

Figure 3:
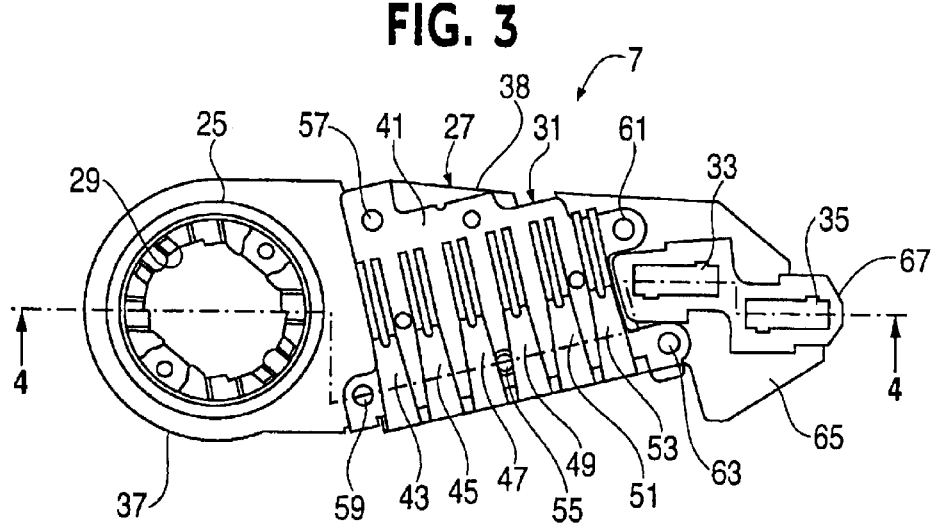
FIG. 3 is a plan view showing a moving block according to the embodiment.
Figure 4:
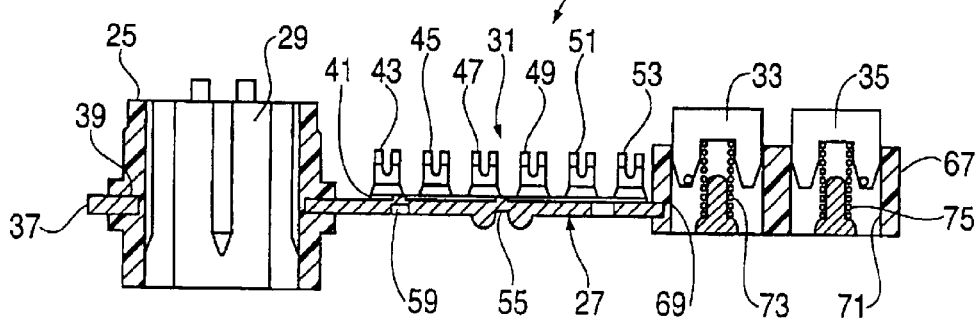
FIG. 4 is a cross sectional view of the embodiment taken along the line 4—4 in FIG. 3.

The moving block 7 is constructed as shown in FIGS. 3 and 4. FIG. 3 is a plan view showing the moving block 7, and FIG. 4 is a cross sectional view taken along the line 4—4 in FIG. 3. As shown in FIGS. 3 and 4, the moving block 7 has a boss portion 25 and a contact support portion 27.

The boss portion 25 is formed of a resin and a fitting hole 29. The fitting hole 29 of the boss portion 25 is fitted onto a manual shaft of an automatic transmission (not shown). The contact support portion 27 supports a signaling contact 31 and a large capacity current-carrying contact 33 and 35 as moving contacts, and is formed of, for example, a metallic plate of iron (SECC). The contact support portion 27 is provided at a base end 37 thereof with a joining hole 39. The joining hole 39 is formed to be circular, and joined to an outer periphery side of the boss portion 25 in a circumferential manner. This joining is performed by insert molding of the base end 37 into the boss portion 25. The base end 37 of the contact support portion 27 is interposed between the terminal block 3 and the casing 5.

The signaling contact 31 is formed from a leaf spring to be supported by an intermediate portion 38 of the contact support portion 27. The signaling contact 31 is a signaling contact to make selective conduction of the fixed contacts 9, 11, 13, 15, 17, and 19 to perform detection through digital coding. The signaling contact 31 comprises, for example, six contact arms 43, 45, 47, 49, 51, and 53 raised from a mount plate 41. The respective contact arms 43, 45, 47, 49, 51, and 53 are formed to be bifurcated at a tip end thereof to come into contact with the respective fixed contacts 9, 11, 13, 15, 17, and 19 at predetermined contact pressures, respectively. The signalling contact 31 is positioned on the contact support portion 27 at, for example, one positioning portion 55, and clamped on the contact support portion 27 at caulking portions 57, 59, 61, 63 in four locations. This positioning portion 55 and caulking portions 57, 59, 61, 63 will be described later in detail.

The large capacity current-carrying contacts 33, 35 are formed to have a larger conductor cross sectional area (cross sectional areas of the contacts 33, 35 in a direction of connection between the fixed contacts), and supported on a tip end 65 farther than the signaling contact 31 on the contact support portion 27 is. That is, mounted to the tip end 65 is a contact receiving portion 67 of a resin. The contact receiving portion 67 is supported on an inner surface of the casing 5. The contact receiving portion 67 is provided with contact fitting portions 69, 71, and the large capacity current-carrying contacts 33, 35 are supported on the respective contact fitting portions 69, 79 through springs 73, 75 as biasing members. The large capacity current-carrying contacts 33, 35 elastically abut against the fixed contacts 21, 23 due to the bias of the springs 73, 75. The large capacity current-carrying contacts 33, 35 come into selective contact with the fixed contacts 21, 23 to make ON and OFF.

Figure 5A:
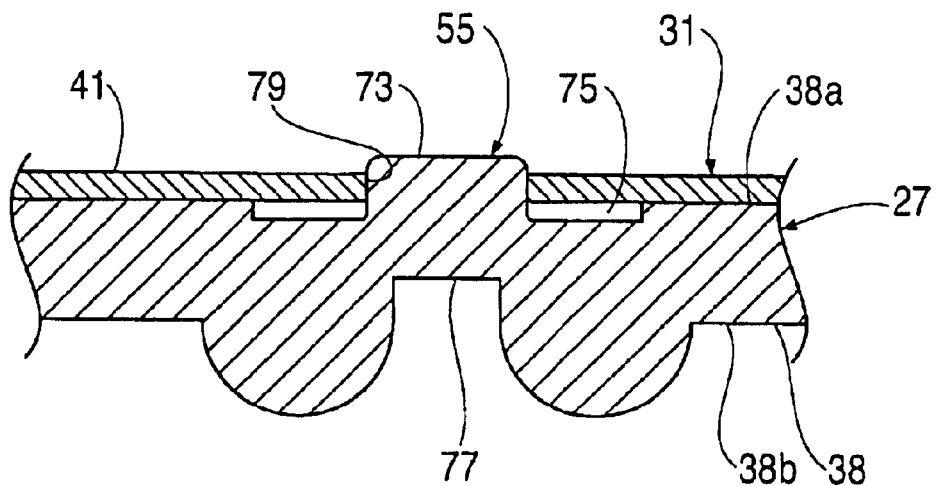
FIG. 5A is an enlarged, cross sectional view of a positioning portion according to the embodiment.
Figure 5B:
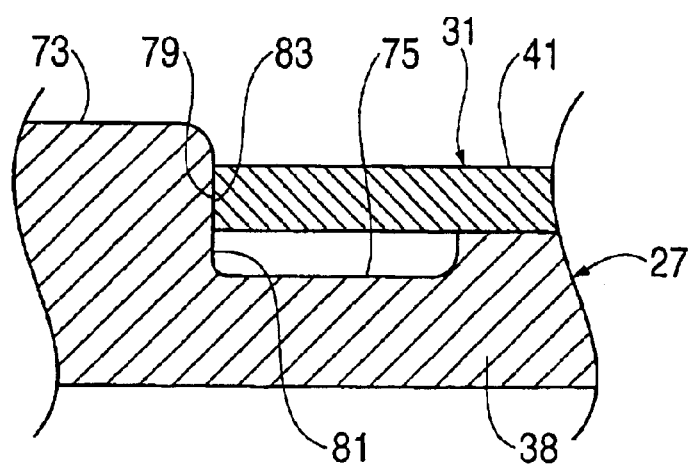
FIG. 5B is a fragmentary, enlarged, cross sectional view of the positioning portion.
Figure 7:
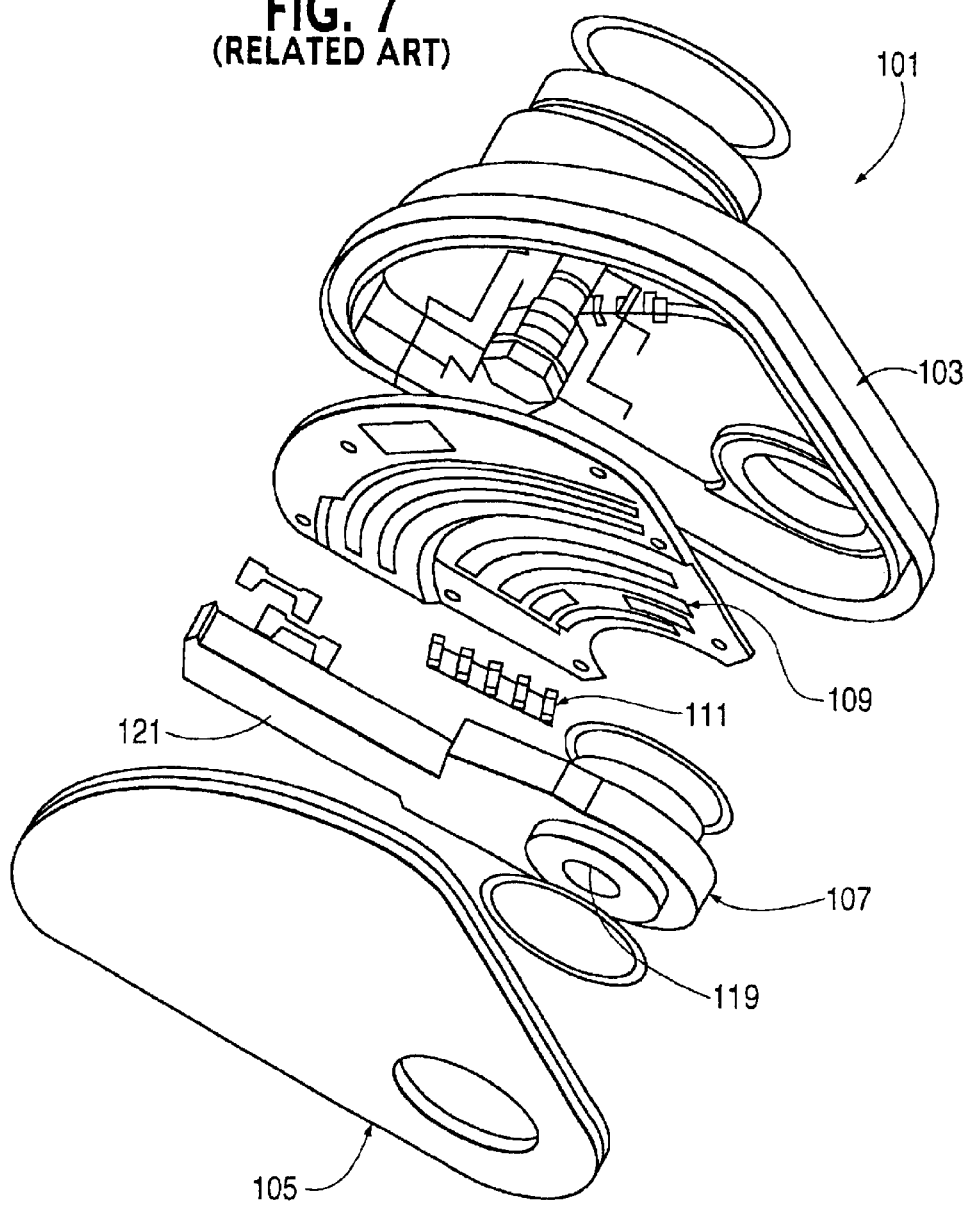
FIG. 7 is an exploded, perspective view showing an inhibitor switch of the related art.
Figure 8:
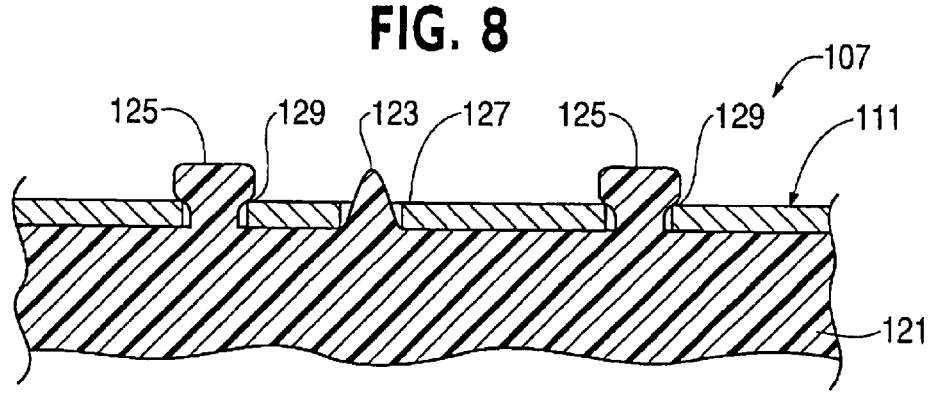
FIG. 8 is a cross sectional view showing an example of positioning and caulking joining.

The positioning portion 55 is structured as shown in FIG. 5. FIG. 5A is an enlarged, cross sectional view of the positioning portion, and FIG. 5B is a fragmentary, enlarged, cross sectional view of the positioning portion. As shown in FIG. 5, the positioning portion 55 is structured such that the intermediate portion 38 of the contact support portion 27 is provided with a positioning projection 73 for positioning.

The positioning projection 73 is formed on the intermediate portion 38 by a press. That is, a press is used to first form a recess 75 on one side 38a of the intermediate portion 38. Subsequently, a recess 77 is formed from the other side 38b of the intermediate portion 38 to punch the positioning projection 73 on the one side 38a. The mount plate 41 of the signaling contact 31 is formed with a positioning hole 79 for positioning.

Then the positioning hole 79 is fitted onto the positioning projection 73 to position the signaling contact 31 on the contact support portion 27. At this time, the presence of the recess 75 enables fitting the positioning hole 79 on a stable surface 83 around the positioning projection 73 without causing the positioning hole 79 of the mount plate 41 to be caught by a rounded portion 81 remaining at a root of the positioning projection 73, whereby the signaling contact 31 can be surely positioned by the positioning projection 73.

The caulking portions 57, 59, 61, 63 are structured as shown in FIG. 6. FIG. 6 is a cross sectional view of the caulking portion 57. The respective caulking portions 57, 59, 61, 63 are structured in the same manner, and so the caulking portion 57 will be explained as being typical of them.

A press is used to form a caulking projection 85 for caulking on the intermediate portion 38 of the contact support portion 27. The caulking projection 85 shown in FIG. 6 has a shape after caulking but projects in a columnar manner with a diameter at a root thereof kept intact, prior to caulking. In the press forming, a recess 87 is formed on the other side 38b of the intermediate portion 38 to punch the projection 85 on the one side 38a. The mount plate 41 of the signaling contact 31 is formed with a caulking hole 89 for caulking.

Thus the caulking hole 89 is fitted onto the caulking projection 85, and the caulking projection 85 is clamped by means of a jig or the like to clamp and join the signaling contact 31 to the contact support portion 27.

When the inhibitor switch 1 is to be assembled to an automatic transmission, the moving block 7 is temporarily mounted on, for example, the terminal block 3, and the fitting hole 29 of the moving block 7 is fitted onto a manual shaft located in a particular speed change position, for example, the N position. Subsequently, the casing 5 is clamped and fixed on a housing of the automatic transmission. Thereby, mounting of the inhibitor switch 1 is completed.

After mounting of the inhibitor switch 1, the manual shaft is correspondingly rotated when a shift lever is moved for inspection. Thereby, temporary mounting of the moving block 7 is released, and so speed change positions in the automatic transmission can be detected through selective conduction of the signaling contact 31 to the fixed contacts 9, 11, 13, 15, 17, and 19. Also, selective conduction of the large capacity current-carrying contacts 33, 35 to the fixed contacts 21, 23, that is, making ON and OFF enables conduction and interruption with a starter motor.

In such a state of use, the inhibitor switch 1 is put into a state in which it is exposed to high temperature on the automatic transmission or an engine side including an exhaust system. Even in this high temperature condition, the arm-shaped contact support portion 27 constituting a major part of the moving block 7 is formed of a metallic plate, so that deformation or camber is not caused as with a resin. Accordingly, the moving block 7 precisely follows rotation of the manual shaft to be able to greatly suppress angular hysteresis, thereby enabling correct detection of speed change positions.

Also, since the contact support portion 27 is joined at the base end 37 to the boss portion 25 in a circumferential manner, rotation of the boss portion 25 caused by rotation of the manual shaft can be precisely transmitted to the contact support portion 27, in which it is possible to suppress angular hysteresis to correctly detect speed change positions.

The positioning projection 73 can be formed on the metallic contact support portion 27 by means of press forming, and so can be exceedingly enhanced in accuracy. Accordingly, it is possible to exceedingly enhance accuracy, with which the signaling contact 31 is mounted on the contact support portion 27. Therefore, a position, to which the signaling contact 31 is rotated with rotation of the manual shaft can be correctly determined, thereby enabling correct detection of speed change positions.

Further, the signaling contact 31 can be metallically clamped on the contact support portion 27 at the caulking projection 85, whereby control on the caulking strength is made easy and the caulking strength can be greatly enhanced. Accordingly, even when space for the caulking portions 57, 59, 61, 63 is not ensured so much, the signaling contact 31 can be surely clamped and joined to the contact support portion 27, which is very advantageous in the inhibitor switch 1 with little margin in space.

Also, enhancement in the caulking strength in the caulking portions 57, 59, 61, 63 makes it possible for the signaling contact 31 to correctly act in accordance with rotation of the moving block 7, which enables correct detection of speed change positions.

Since the large capacity current-carrying contacts 33, 35 are supported on the tip end side farther than the signaling contact 31 on the contact support portion 27 is, a circumferential contact spacing defined on the respective fixed contacts 21, 23, of which ON and OFF are detected with elastic contact by the large capacity current-carrying contacts 33, 35, can be ensured as large as possible in association with a lever ratio (turning radius ratio about the boss portion 25). Being greater in contact pressure than that with the signaling contact 31, the large capacity current-carrying contacts 33, 35 are liable to produce abrasion powder at the time of sliding, so that when circumferential spacings of respective portions on the fixed contacts 21, 23 are small, the possibility that failure in conduction is caused by abrasion powder present between the fixed contacts 21, 23 becomes high. By ensuring a large circumferential spacing between the fixed contacts 21, 23 in association with a lever ratio as described above, failure in conduction can be suppressed even in the presence of abrasion powder.

Since the contact support portion 27 is formed of metal, the positional accuracy is enhanced also on the outer peripheral side to enable greatly enhancing accuracy in detection of ON and OFF of the large capacity current-carrying contacts 33, 35.

The large capacity current-carrying contacts 33, 35 for current-carrying to the starter motor and the like are larger in contact pressure and conductor cross sectional area than the signaling contact 31, and as such are not easily supported directly on the metallic arm shaped contact support portion 27. The contact receiving portion 67 formed of a resin is provided on a tip end side of the contact support portion 27 to be able to easily support the large capacity current-carrying contacts 33, 35.

The boss portion 25 and the large capacity current-carrying contacts 33, 35 provided on the tip end side of the contact support portion 27 can put the contact receiving portion 67 in a center state. That is, the base end 37 of the contact support portion 27 is interposed between the terminal block 3 and the casing 5, the contact receiving portion 67 is supported on the inner surface of the casing 5, and the large capacity current-carrying contacts 33, 35 are pushed against the terminal block 3 by the bias of the springs 73, 75, whereby the signaling contact 31 can be stabilized in contact pressure even when the signaling contact 31 is formed of a leaf spring.

What is claimed is:

1. An inhibitor switch comprising a terminal block with fixed contacts, and a moving block which is mounted and fitted onto a manual shaft of an automatic transmission, has moving contacts, and is rotatable relative to the terminal block, and for electrically detecting a speed change position of the automatic transmission on the basis of a relative rotating positional relationship of the fixed contacts and the moving contacts in accordance with rotation of the manual shaft, the moving block having a boss portion formed of a resin and being mounted on the manual shaft, and an arm-shaped contact support portion mounting thereon the moving contacts, the contact support portion being formed of metal and at least a part of the moving contacts being joined to the contact support portion by caulking.

2. The inhibitor switch according to claim 1, wherein a positioning projection for positioning is formed on the contact support portion by means of a press, a positioning hole for positioning is formed on at least a part of the moving contacts, and the positioning hole is fitted onto the positioning projection to position at least a part of the moving contacts relative to the contact support portion.

3. The inhibitor switch according to claim 2, wherein a caulking projection for caulking is formed on the contact support portion by means of a press, a caulking hole for the caulking is formed on at least a part of the moving contacts, and the caulking hole is fitted onto the caulking projection to effect the caulking.

4. The inhibitor switch according to any one of claims 1 to 3, wherein a part of the moving contacts comprises a signaling contact formed of a leaf spring and another part of the moving contacts comprises large capacity current-carrying contacts having a larger conductor cross sectional area than that of the signaling contact, the signaling contact is joined to an intermediate portion of the contact support portion by caulking, and a contact receiving portion formed of a resin is provided on a tip end side of the contact support portion farther than a position of the signaling contact and the large capacity current-carrying contacts are received in the contact receiving portion with biasing members therebetween to elastically bias the large capacity current-carrying contacts toward the fixed points.

5. The inhibitor switch according to any one of claims 1 to 3, wherein the contact support portion has a joining hole, which is joined to the boss portion circumferentially.

6. The inhibitor switch according to claim 5, wherein a part of the moving contacts comprises a signaling contact formed of a leaf spring and another part of the moving contacts comprises large capacity current-carrying contacts having a larger conductor cross sectional area than that of the signaling contact, the signaling contact is joined to an intermediate portion of the contact support portion by caulking, and a contact receiving portion formed of a resin is provided on a tip end side of the contact support portion farther than a position of the signaling contact and the large capacity current-carrying contacts are received in the contact receiving portion with biasing members therebetween to elastically bias the large capacity current-carrying contacts toward the fixed points.

* * * * *